United States Patent [19]
Balaban et al.

[11] 4,327,376
[45] Apr. 27, 1982

[54] DUAL PHASE-CONTROL LOOP HORIZONTAL DEFLECTION SYNCHRONIZING CIRCUIT

[75] Inventors: Alvin R. Balaban, Lebanon; Steven A. Steckler, Clark, both of N.J.

[73] Assignee: RCA Corporation, New York, N.Y.

[21] Appl. No.: 129,841

[22] Filed: Mar. 13, 1980

Related U.S. Application Data

[63] Continuation of Ser. No. 948,775, Oct. 5, 1978, abandoned.

[51] Int. Cl.³ .................. H04N 5/04; H03K 5/20; H03B 3/04; H03K 1/17
[52] U.S. Cl. .................. 358/159; 307/494; 307/527; 331/20; 328/155
[58] Field of Search .......... 358/19, 158, 159, 948, 358/775, 20, 17; 331/8, 20, 27, 25; 328/133, 155; 307/232, 494, 527

[56] References Cited

U.S. PATENT DOCUMENTS

| | | | |
|---|---|---|---|
| 3,730,989 | 5/1973 | Rhee | 331/8 X |
| 3,863,080 | 1/1975 | Steckler | 358/159 X |
| 3,891,800 | 6/1975 | Hanseen et al. | 358/159 |
| 3,924,202 | 12/1975 | Craft | 331/8 X |
| 4,047,223 | 9/1977 | Hofmann | 358/159 X |
| 4,068,188 | 1/1978 | Yokoyama | 331/8 |
| 4,093,963 | 6/1978 | Uchida | 358/159 X |
| 4,216,396 | 8/1980 | Balaban et al. | 307/232 X |
| 4,242,602 | 12/1980 | Nakagawa et al. | 307/232 |

FOREIGN PATENT DOCUMENTS

| | | | |
|---|---|---|---|
| 7511633 | 4/1977 | Netherlands | 358/159 |
| 1354894 | 5/1974 | United Kingdom . | |

OTHER PUBLICATIONS

Mullard Technical Communications, No. 118, Apr. 1973.
U.K. Patent Application GB 2011743 A; published Jul. 11, 1979.

*Primary Examiner*—Aristotelis M. Psitos
*Attorney, Agent, or Firm*—Paul J. Rasmussen; William H. Meise; W. Brinton Yorks, Jr.

[57] ABSTRACT

A television horizontal deflection synchronizing system uses two phase-lock loops. A horizontal oscillator operating at a frequency greater than the horizontal frequency is counted and a bilevel signal near the horizontal frequency is generated. A first phase-lock loop having a relatively long time constant controls the oscillator to maintain the bilevel signal in frequency and phase synchronism with horizontal synchronizing signals. In order to compensate for load-dependent variations in the delay of the horizontal deflection stage, a second phase-lock loop is used. The second phase-lock loop includes a phase detector, one input of which is coupled to an output of the first phase-lock loop and a second input of which is coupled to the deflection circuit for responding to the retrace pulse for enabling the phase detector to produce a current of a first polarity when the bilevel signal has a first value and a current of a second polarity when the bilevel signal has a second value. A loop filter is coupled to an output of the phase detector for filtering the first and second polarity currents to form a control signal. A phase controllable source includes a control input coupled to the loop filter for producing horizontal-rate drive pulses at a time which makes the retrace pulses synchronous with the bilevel signal.

8 Claims, 30 Drawing Figures

DUAL PHASE-CONTROL LOOP HORIZONTAL DEFLECTION SYNCHRONIZING CIRCUIT

This is a continuation of application Ser. No. 948,775, filed Oct. 5, 1978 now abandoned.

This invention relates to a dual phase-control loop horizontal deflection synchronizing circuit.

Television displays of broadcast television signals are generated by repetitively scanning an electron beam over the surface of a picture tube viewing screen. The beam intensity is modulated by video signals to form images on the screen representative of the picture to be displayed. In order to synchronize the scanning of the beam with the display information, the scanning or deflection circuits are synchronized with synchronization signals combined with the image information in composite video. As received, the composite video may contain distortions in the form of electrical and thermal noise.

As transmitted, the synchronizing signal pulses recur at a rate which is carefully controlled and extremely stable. Since the presence of noise obscures the synchronizing signals in a random manner, it has become common practice to obtain synchronization of the horizontal deflection circuit with the horizontal synchronizing signal pulses by the use of an oscillator the frequency of which is controlled by a phase-lock loop to equal the synchronizing signal frequency. Thus when any one synchronizing pulse is obscured by noise, the rate of the oscillator remains substantially unchanged, and the deflection circuits continue to receive regular deflection control pulses.

In the normal operation of a television display, the horizontal deflection circuit produces high-voltage pulses in order to form the relatively rapid repetitive scan. It is customary to derive the high ultor voltage required for operation of the kinescope by rectifying and filtering the high-voltage pulses. Often, the horizontal deflection circuit drives a power supply producing low voltage for the remainder of the television receiver. It has been discovered that the timing of the retrace pulses produced by the horizontal deflection circuit varies in a manner dependent upon the loading of the deflection circuit, as for example, dependent upon the brightness of the image being displayed on the kinescope. This variation in the delay of the horizontal deflection circuit causes distortion of the image being displayed.

U.S. Pat. No. 3,891,800 issued June 24, 1975 in the name of Janssen et al. describes a synchronization arrangement in which a second phase-control loop is coupled to the output of the first. The second loop includes a second oscillator and a second phase detector. An integrator coupled to the output of the horizontal deflection circuit integrates the retrace pulses and applies the resulting sawtooth to an input of the phase detector for comparison with the pulses controlled at the average rate of the incoming synchronizing pulses. A short time-constant filter couples the output of the second phase detector to the second oscillator for controlling its phase to maintain the retrace pulses in synchronism with the output of the first phase-lock loop. This has the disadvantage that the phase control in the second loop is dependent upon the duration of the retrace pulses.

Mullard Technical Communications No. 118, April, 1973, describes a dual-loop system in which a sawtooth oscillator is controlled to the average value of the incoming synchronizing signals by a first phase-lock loop, and a second phase-control loop is coupled to the sawtooth output of the oscillator. The second phase-control loop includes a controllable phase shifter and a second phase detector. The phase detector responds to the sawtooth output of the oscillator and to the retrace pulses to produce a signal which is filtered with a short time constant and used to control the phase of the controllable phase shifter coupled between the oscillator and the horizontal deflection circuit in order to maintain the retrace pulses synchronous with the average value of the incoming synchronizing signals.

It is desirable for purposes of stability to use an oscillator the frequency of which is controlled by an inductor and a capacitor rather than by a resistor and capacitor. However, if oscillator operation at the horizontal deflection frequency is contemplated, large inductors and capacitors are required which are not only costly but which are also physically large and tend to pick up signals from the high-power deflection circuits, which causes oscillator instability. It is therefore desirable to use small-value inductors and capacitors as the frequency determining elements of the horizontal oscillator. This, however, requires a relatively high operating frequency. With the advent of integrated circuits, it has become practical to use a high-frequency horizontal oscillator and a chain of digital frequency dividers to produce a horizontal-rate signal with high stability. However, the output of this frequency-division chain is a digital or bilevel signal. The bilevel signal can be locked to the average time of the incoming synchronizing signals by a first phase-lock loop as in the Jannsen reference. While it is always desirable to reduce the number of stages of signal processing required to accomplish a given function, it is particularly important in integrated circuit practice to reduce the number of interface connections between the integrated circuit and external components.

SUMMARY OF THE INVENTION

A horizontal drive circuit synchronizing arrangement for a television display apparatus includes a source of horizontal synchronizing signals and also includes a horizontal deflection circuit responsive to drive pulses to produce deflection current defining recurrent trace and retrace intervals and which also produces retrace pulses delayed with respect to the drive pulses as a function of the loading of the deflection circuit. The arrangement includes a first phase-lock loop for producing a substantially bilevel signal in synchronism with average horizontal synchronizing signals and also includes a second phase-lock loop for maintaining the retrace pulses in synchronism with the bilevel signal. The second loop includes a phase detector having a first input coupled to an output of the first phase-lock loop and a second input coupled to the deflection circuit and which responds to the retrace pulses to enable the phase detector to produce a current of a first polarity when the bilevel signal is in a first state and to enable it to produce a current of a second polarity when the bilevel signal is in a second state. The second loop also includes a loop filter coupled to an output of the phase detector for filtering the first and second polarity currents to form a control signal, and a phase-controllable apparatus having a control input coupled to the loop filter for producing the drive pulses for maintaining the retrace pulses in synchronism with the bilevel signal.

DESCRIPTION OF THE INVENTION

Figure 1:
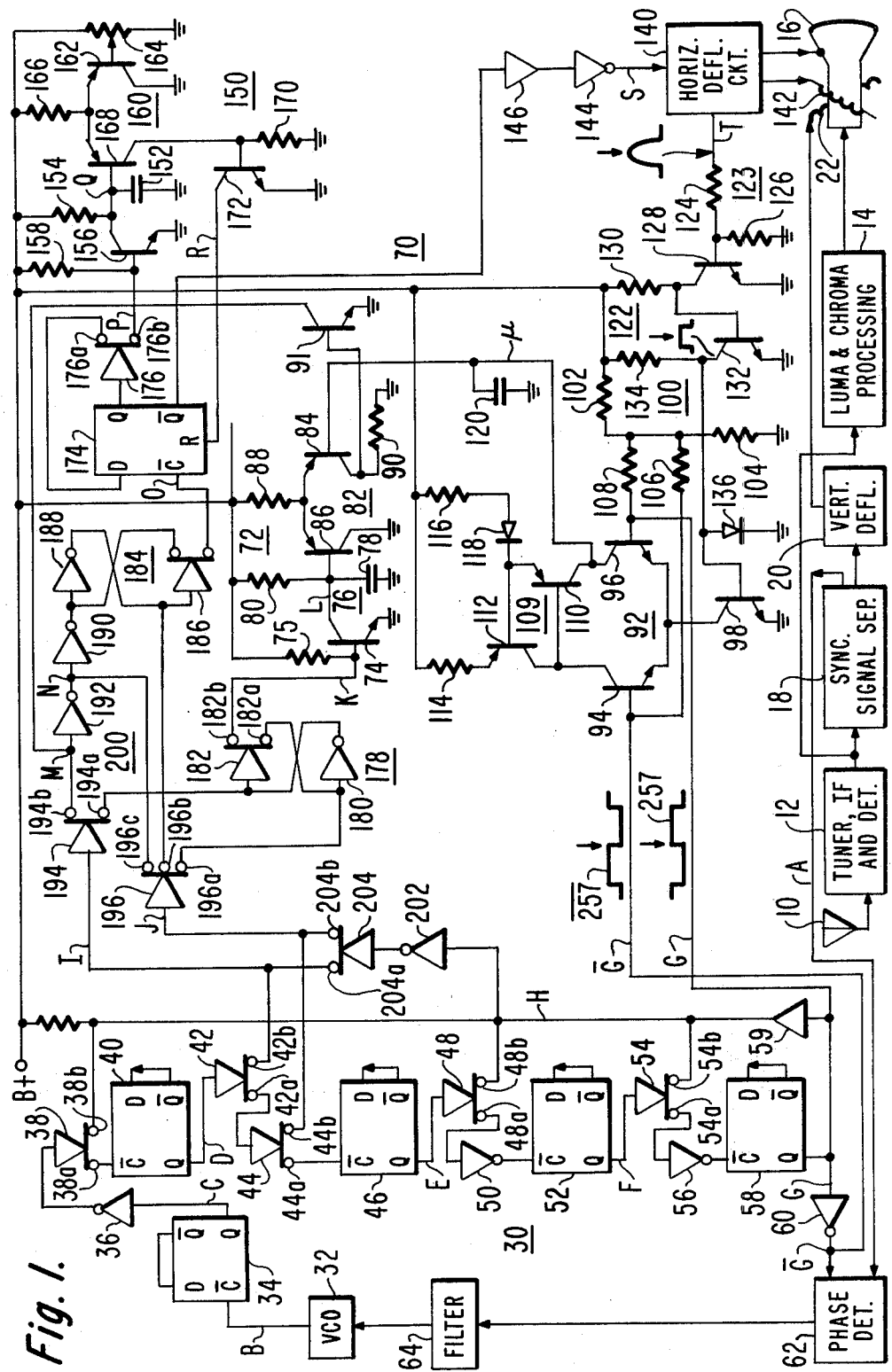
FIG. 1 is a diagram in block and schematic form of a television arrangement embodying the invention.

FIG. 1 illustrates a television receiver including an antenna 10 at bottom center for receiving broadcast signals which are coupled to a tuner, intermediate frequency amplifier and detector illustrated as a block 12 in which the broadcast signal is selected, amplified and demodulated to produce a composite video. The composite video is applied to various luminance and chrominance processing circuits illustrated as a block 14, and the processed signals are applied to a kinescope 16 for display. Composite video is also applied to a synchronizing signal separator illustrated as a block 18 in which the vertical and horizontal synchronizing signals are separated. The vertical synchronizing signals are applied to a vertical deflection circuit 20 for controlling deflection current in a vertical deflection winding 22 associated with kinescope 16.

Horizontal synchronizing signals illustrated by waveform 251 in FIG. 2a, are coupled from synchronizing signal separator 18 over a conductor A to a phase-lock loop designated generally as 30 at the left of FIG. 1. Phase-lock loop 30 produces bilevel pulses which are applied by way of conductors G and $\overline{G}$ to a phase-control loop 70, which applies drive pulses over a conductor S to a horizontal deflection circuit illustrated as a block 140 at lower right. Horizontal deflection circuit 140 produces deflection current defining recurrent trace and retrace intervals in a horizontal deflection winding 142 associated with kinescope 16. Horizontal deflection circuit 140 also produces ultor voltage for kinescope 16, and, as is known, the horizontal deflection circuit is variably loaded thereby.

Phase-lock loop 30 includes a voltage-controlled oscillator (VCO) illustrated as a block 32, which produces 503.5 KHz pulses as illustrated by 252 in FIG. 2b on a conductor B. The oscillator signal is applied to a 32-to-1 divider including D-type flip-flops (FF) 34, 40, 46, 52 and 58. The Q output of a D flip-flop assumes the D (data) state at the falling edge of a signal applied to the $\overline{C}$ (clock) input. If the $\overline{Q}$ output of a D-type flip-flop is coupled to the D input, it will divide the signal at its clock input by two and produce a divided signal at the Q output. The VCO signal 252 is divided by 2 by FF 34 and produces at its Q output a signal such as that illustrated by 253 in FIG. 2c, which is coupled by conductor C to a cascaded pair of inverting amplifiers 36 and 38. A first output 38a of inverter 38 is coupled to the $\overline{\text{clock}}$ input of FF 40, and a second output 38b is coupled to a bus conductor H. Flip-flop 40 divides by two and produces at its Q output a signal such as that illustrated by 254 in FIG. 2d, which is coupled by way of a conductor D to the input of an inverting amplifier 42. An output 42a of inverter 42 is coupled to the input of an inverter 44, and an output 44a of inverter 44 is coupled to the clock input of FF 46. Flip-flop 46 divides the signal at its clock input by 2 and produces a signal illustrated as 255 of FIG. 2e at its Q output. The Q output of flip-flop 46 is coupled over a conductor E to the input of an inverter 48, one output 48a of which is coupled to the input of an inverter 50, the other output 48b being coupled to bus conductor H. The output of inverter 50 is coupled to the $\overline{C}$ input of flip-flop 52, and a divided signal illustrated as 256 of FIG. 2f is produced at the Q output of flip-flop 52 and is coupled by a conductor F to the input of an inverter 54. Output 54b of inverter 54 is coupled to conductor H, and output 54a is coupled to the input of an inverter 56. The output of inverter 56 is coupled to the $\overline{C}$ input of flip-flop 58. A signal illustrated by 257 in FIG. 2g is produced at the Q output of FF 58 and is coupled over a conductor G to the input of an inverter 60 and to phase-control loop 70. The Q output of FF 58 is also coupled by a buffer amplifier 59 to conductor H. The output of inverter 60 is the inverse $\overline{257}$ of signal 257 and is coupled by a conductor $\overline{G}$ to an input of a phase detector 62 and to phase-control loop 70.

Phase detector 62 compares signal $\overline{257}$ with horizontal synchronizing signals 251 and produces a control signal which is applied to a loop filter illustrated as block 64 and routed to the control input of VCO 32. Phase-lock loop 30 controls binary or bilevel signals 257 on conductor G and $\overline{G}$ to maintain a transistion of waveforms 257 in synchronism with the average synchronizing pulse signal produced by separator 18.

As mentioned, there may be a load-dependent delay between the time of the horizontal deflection drive pulse and the resulting horizontal synchronizing pulse. This delay may be as great as 15 microseconds, representing approximately 90° of the horizontal period. Phase control loop 70 includes a controllable phase-shifting network 72 to which signals produced by loop 30 are applied. The delay of circuit 72 is controlled by the output of a phase detector 92 which is enabled by horizontal retrace pulses and which produces current of first and second polarities, when bilevel signals 257 produced by loop 30 have first and second states, respectively. The currents produced by phase detector 92 are filtered and applied to delay circuit 72 to maintain synchronism between the retrace pulses and the bilevel signal transition.

Phase control circuit 70 includes retrace pulse shaping circuits designated generally as 122 at lower right in FIG. 1, deflection drive duration circuits designated generally as 150 at upper right and logic circuits designated generally as 200 at upper center. Logic circuits 200 produce drive signals for delay circuit 72 and process the signals to guarantee a pulse output even if delay circuit 72 is at an extreme of its range. Logic circuit 200 includes an inverter 202 having its input coupled to bus conductor H and its output coupled to a further inverter 204. Output 42b of inverter 42 is coupled to an output 204a of inverter 204 and the combined output signal as illustrated by 259 in FIG. 2i is coupled over a conductor I to the input of an inverter 194. Similarly, output 44b of inverter 44 is coupled to output 204b of inverter 204, and a signal illustrated by 260 in FIG. 2j is coupled over a conductor J to the input of an inverter 196. Signals 259 and 260 are in a fixed time relationship with signals 257. Output 196a of inverter 196 is coupled to an input of a flip-flop designated as 178 and including inverters 180 and 182. The output of inverter 180 is coupled to the input of inverter 182, and an output 182a of inverter 182 is coupled to the input of inverter 180. An output 194a of inverter 194 is coupled to the input of inverter 182. The output of FF 178 appears on a conductor K which is connected to an output 182b of inverter 182.

An output 196b of inverter 196 is coupled to the input of an inverter 186, which is cross-coupled with an inverter 188 to form a FF 184. This guarantees an output from FF 184.

A signal illustrated as 263 in FIG. 2m is generated at an output 194b of inverter 194 and is coupled to the input of an inverter 192 by a conductor M. The input of inverter 192 is also coupled to the collector of an NPN transistor 91 at the output of delay circuit 72. A signal illustrated as 264 in FIG. 2n is generated by inverter 192 and is applied via a conductor N to the input of an inverter 190, the output of which is coupled to the input of inverter 188 of FF 184. An output 196c of inverter 196 is also coupled to the input of inverter 190.

The output signal of FF 178 is coupled to the base of an NPN transistor 74 by a conductor K. The base of transistor 74 also receives bias from B+ through a resistor 75. The collector-emitter path of transistor 74 is coupled via a conductor L across a ramp capacitor 78 for periodic discharge thereof. Capacitor 78 receives charging current from B+ through a resistor 80. The periodic ramp generated across capacitor 78 is coupled to the base of a PNP transistor 86 of a comparator designated generally as 82. Comparator 82 includes a PNP transistor 84 coupled at its emitter with the emitter of transistor 86 and by way of a resistor 88 to B+. The collector of transistor 86 is connected to ground. The collector of transistor 84 is coupled to the base of transistor 91 and to ground by way of a resistor 90. The base-emitter junction of transistor 91 is coupled across resistor 90 for coupling a delayed signal to the input of inverter 192.

The output of FF 184 is coupled by a conductor O to the $\overline{C}$ input of a FF 174 of deflection drive duration circuit 150. The Q output of FF 174 is coupled to the input of an inverter 176, an output 176a of which is coupled to the D input of FF 174, and another output 176b of which is coupled by way of a conductor P to the base of an NPN switch transistor 156. Outputs 176a and 176b produce signals in-phase with the $\overline{Q}$ output of FF 174. The base of transistor 156 receives bias current from B+ through a resistor 158, and its collector-emitter path is coupled by a conductor Q across a ramp capacitor 152. Capacitor 152 charges from B+ by way of a resistor 154. The recurrent ramp output of capacitor 152 is coupled to the base of a PNP transistor 168 of a comparator designated generally as 160. A PNP transistor 162 has its emitter coupled to the emitter of transistor 168 and to B+ by way of a resistor 166. The collector of transistor 162 is connected to ground and its base is connected to the wiper of a potentiometer 164 coupled between B+ and ground for deflection drive duration adjustment. An output is taken from comparator 160 across a resistor 170 coupled between the collector of transistor 168 and ground. Resistor 170 is coupled across the base-emitter junction of an NPN transistor 172, the collector of which is connected to the reset input of FF 174. The $\overline{Q}$ output of FF 174 is coupled to the input of an inverting amplifier 144 by a buffer amplifier 146. The output of inverter 144 is coupled to the input of a horizontal deflection circuit 140 by a conductor S.

The retrace pulses produced by horizontal deflection circuit 140 in response to deflection drive on conductor S are coupled by a conductor T to pulse-shaping circuit 122. Circuit 122 includes a voltage divider 123 consisting of resistors 124 and 126. The base-emitter junction of an NPN transistor 128 is coupled across resistor 126. The collector of transistor 128 is coupled to B+ by a load resistor 130 and is also connected to the base of an NPN transistor 132, the emitter of which is grounded. The collector of transistor 132 is coupled to B+ by a load resistor 134. The collector of transistor 132 is connected to the anode of a diode 136, the cathode of which is grounded. The base-emitter junction of an NPN transistor 98, representing an input of phase detector 92, is coupled across diode 126. The collector of transistor 98 is connected to the emitters of NPN transistors 94 and 96 for supplying current thereto. A voltage divider 100 including resistors 102 and 104 is coupled between B+ and ground. The bases of transistors 94 and 96 are coupled to the tap on divider 100 by resistors 106 and 108, respectively, for receiving bias therefrom. The collector of transistor 94 is coupled to the collector of transistor 96 by a current mirror designated generally as 109. Mirror 109 includes a PNP transistor 110, the base of which is connected to the collector of transistor 94 and to the collector of a PNP transistor 112. The emitter of transistor 110 is connected to the base of transistor 112 and coupled to B+ by the series combination of a resistor 116 and diode 118. The emitter of transistor 112 is coupled to B+ by a resistor 114. The collector of transistor 110 is connected to the collector of transistor 96 to form an output terminal of phase detector 92. The output of phase detector 92 is coupled to the base of transistor 84 by a conductor $\mu$. A filter capacitor 120 is coupled between conductor $\mu$ and ground for filtering the currents produced by phase detector 92 to form a phase control signal by which delay circuit 72 is controlled for controlling the deflection drive in such a manner as to maintain the horizontal retrace pulses in synchronism with bilevel signals 257 on conductors G and $\overline{G}$.

Figure 2:
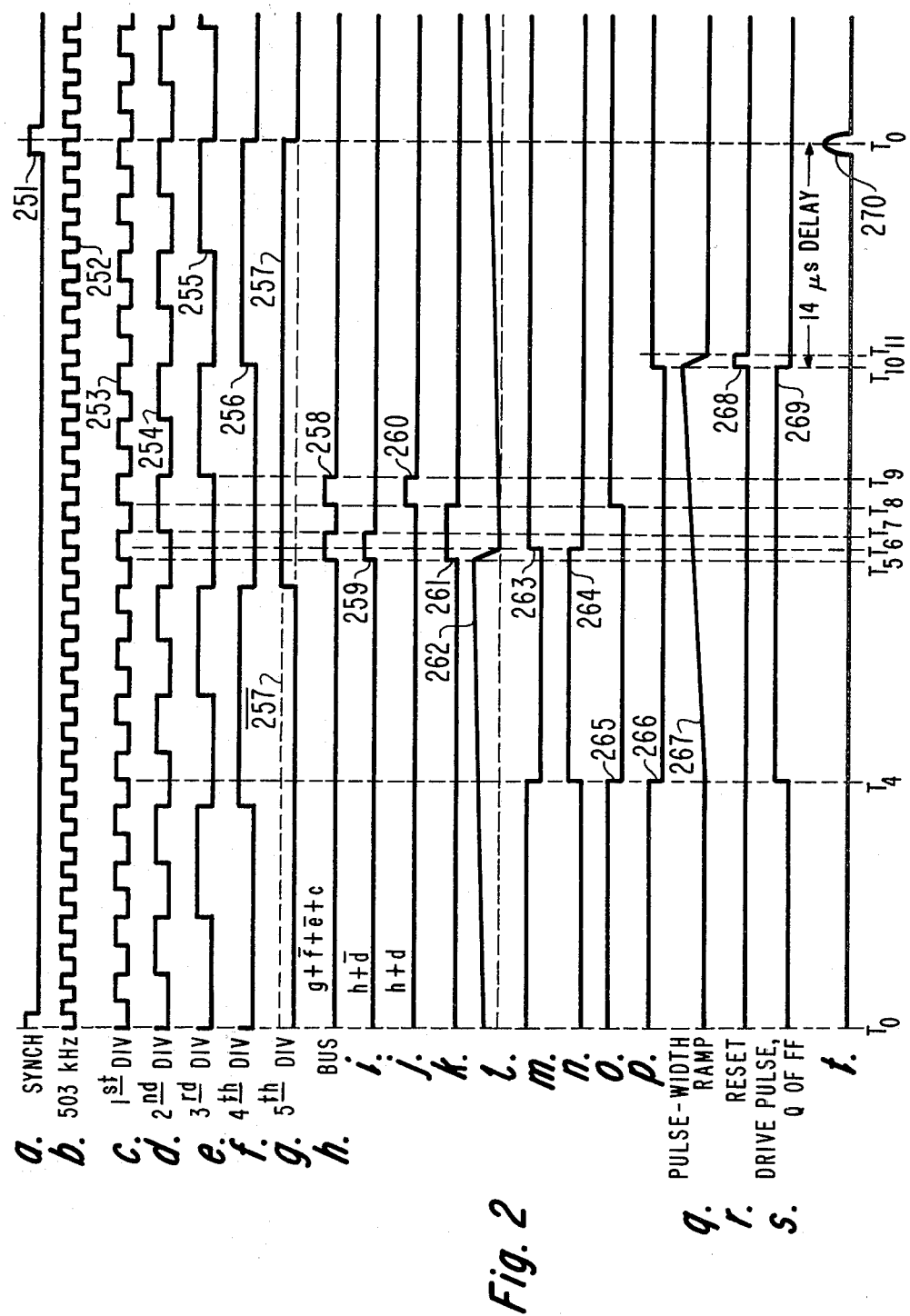
FIGS. 2a-t and 3a-i illustrate as amplitude-time waveforms various voltages occurring in the arrangement of FIG. 1.

The detailed operation of the arrangement of FIG. 1 may best be explained in conjunction with the waveforms of FIG. 2. The waveforms illustrated in FIGS. 2a–2t illustrate the waveforms of the voltages on conductors of speaking, PLL 30 produces signal waveforms 259 and 260 in timed relationship with signal waveforms 257 and $\overline{257}$. Logic circuit 200 applies signals 259 and 260 to delay circuit 72 to produce a signal 265 which is applied to deflection drive duration circuit 150. Duration circuit 150 produces a drive pulse of constant duration for application to horizontal deflection circuit 140. The deflection circuit produces a retrace pulse which is shaped and then compared with the 257 signals in phase detector 92. Any phase discrepancy generates an error signal which controls delay circuit 72 to reduce the discrepancy.

In operation, VCO 32 produces 503 KHz pulses 252 and the counter chain of PLL 30 produces waveforms 253–257 in succession. Phase detector 62 is responsive to signal 257 and corrects VCO 32 in known manner to maintain the negative-going transition of signal 257 coincident with time T0 of the center of the horizontal synchronizing pulse 251. The voltage of conductor H is pulled down to a more negative value corresponding to a logic 0 by the outputs of inverters 38, 48, 54 or by buffer 59. If not pulled down, it remains high (logic 1). Consequently, bus H will be negative during those intervals in which signals 253 or 257 are negative, and also when signals 255 or 256 are positive. Thus signal 258 remains negative in the intervals T0–T5, T7–T8 and T9–T10. Signal 259 on conductor I will be negative when signal 258 on conductor H is negative and also when signal 254 on conductor D is positive. Thus, signal 259 on conductor I is positive only in the interval T5–T7. In the same way, signal 260 on conductor J is negative when signals 254 or 258 are negative, allowing signal 260 to be positive only in the interval T8–T9. In the interval preceding time T5, FF 178 is in a state such that signal 261 on conductor K is low. At time T5, signal 259 on conductor I goes high and the input of inverter 182 goes low, causing FF 178 to switch states and produce a logic 1 on conductor K. The switched state is maintained until a later time T8, at which time signal 260 on conductor J goes positive, resetting FF 178. Thus, a pulse is generated on conductor K in the interval T5–T8 which is in a fixed time relationship with time T0 to which PLL 30 is locked. The pulse of signal 261 causes transistor 74 to conduct and discharge capacitor 78 in the interval T5–T8 preparatory to generating a ramp voltage. At time T8, transistor 74 becomes nonconductive and a ramp voltage illustrated as 262 in FIG. 2 is initiated on conductor L. In the interval immediately after T8, transistor 86 of comparator 82 is conductive and transistor 84 is nonconductive. Consequently, transistor 91 is nonconductive.

Ramp voltage 292 increases until reset by the next following pulse 261. At some time such as T4, ramp voltage 262 will equal the output voltage of phase detector 92 and comparator 82 will switch, causing transistor 91 to conduct and pull down the voltage on conductor M as illustrated in FIG. 2m. Inverter 192 inverts signal 263 to form a signal illustrated as 264 of FIG. 2n on conductor N, which in turn causes FF 184 to switch and initiate a negative-going pulse on conductor O illustrated as 265 in FIG. 2o. Time T4 defines the time of the beginning of the drive pulse applied to horizontal deflection circuit 140.

Immediately prior to time T4, FF 174 of deflection drive duration circuit 150 is in its reset state, with its Q output low and $\overline{Q}$ output high. At time T4, the negative-going transition of signal 265 applied to its clock input sets FF 174. The $\overline{Q}$ output goes low, and due to inverter 144 creates a positive-going drive pulse on conductor S, as illustrated by waveform 269 of FIG. 2s. At the same time the Q output becomes a logic 1, causing the output of inverter 176 on conductor P to go to a logic 0 as illustrated by voltage waveform 266 of FIG. 2p. With conductor P at logic 0, the base-emitter junction of transistor 156 is deenergized, and capacitor 152 begins to charge, forming a ramp illustrated as 267 of FIG. 2q on conductor Q. The ramp voltage rises until a time such as T10 at which the ramp voltage equals the reference voltage applied to the base of transistor 162. At time T10, comparator 160 switches and turns off transistor 172. With transistor 172 nonconductive, the voltage on conductor R rises to form a pulse as illustrated by waveform 268 of FIG. 2r. The logic 1 on conductor R resets FF 174, thereby turning on transistor 156 and discharging capacitor 152 in preparation for the next cycle of operation. Resetting of FF 174 at time T10 terminates deflection drive pulse 269 applied to deflection circuit 140. At some later time a retrace pulse illustrated as 270 in FIG. 2t is generated by deflection circuit 140. As illustrated, retrace pulse 270 is delayed by about 7 cycles of the 503 KHz pulses, or about 14 μsec.

Figure 3:
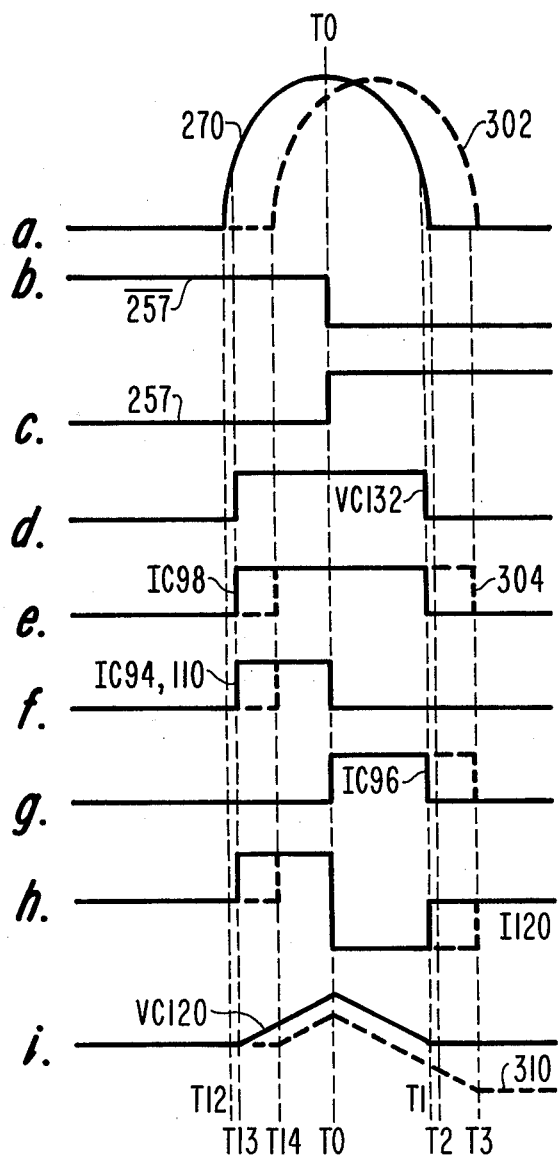

The remainder of the loop is explained in conjunction with FIG. 3, which illustrates waveforms in the vicinity of time T0 at a time scale different from that of FIG. 2. A horizontal retrace pulse 270 generated by deflection circuit 140 on conductor T is illustrated in FIG. 3a in the interval T12–T2. Retrace pulse 270 is initiated at time T12 in response to termination of drive pulse 269 at time T10. FIGS. 3b and 3c illustrate signals $\overline{257}$ and 257, which are applied to phase detector 92 on conductors $\overline{G}$ and G. Pulse 270 is amplified and clipped by pulse shaping circuit 122, and the resulting pulse at the collector of transistor 132 is illustrated by VC 132 of FIG. 3d. The leading edge of pulse VC 132 occurs at a time T13, and the lagging edge at a time T1. Transistor 98 responds to pulse VC 132 with a collector current related to the pulse amplitude. Since the pulse amplitude is constant, transistor 98 produces a collector current pulse with constant amplitude as illustrated by IC 98 of FIG. 3e. This collector current is available to transistors 94 and 96.

Either transistor 94 or 96 will conduct the current available from transistor 98, depending upon the applied base voltage. As illustrated in FIG. 3, in the interval preceding time T0 voltage 257 applied to the base of transistor 94 is more positive than voltage $\overline{257}$ applied to the base of transistor 96. Consequently, transistor 94 conducts to the exclusion of transistor 96, as illustrated by IC 94 and IC 96 in FIGS. 3f and 3g in the interval T13–T0. Conduction of transistor 94 causes an equal conduction of transistor 110 of current mirror 109. The flow of current in transistor 110 tends to charge capacitor 120 with a current illustrated as a positive current I120 of FIG. 3h. As known, the constant charging current flowing in capacitor 120 in the interval T13–T0 results in an increasingly positive ramp voltage illustrated as VC 120 of FIG. 3i.

At time T0, voltage $\overline{257}$ becomes more positive than 257, and transistor 96 conducts to the exclusion of transistor 94, as illustrated by collector currents IC 94 and IC 96. Conduction by transistor 96 causes a current flow in capacitor 120 which tends to discharge the capacitor, illustrated as a negative current I120 of FIG. 3h. The discharging current in transistor 96 is equal to the previous charging current. As known, the constant discharging current flowing in capacitor 120 in the interval T0–T1 results in a ramp voltage illustrated as VC 120 of FIG. 3i which decreases at the same rate as that at which it was previously charged by transistors 94, 110 and 112. During the interval T0–T1, the voltage on capacitor 120 ramps back to the same voltage which it had prior to time T13. Consequently, with the retrace pulse interval T12–T2 centered on the time at which the transition of signals 257 occurs, capacitor 120 neither charges or discharges, and the reference voltage applied to comparator 82 of delay circuit 72 remains unchanged.

In the event of increased loading of deflection circuit 140, the retrace pulse may be further delayed to an interval such as T14–T3 as illustrated by dotted waveform 302 of FIG. 3a. In this condition, collector current flows in transistor 98 during substantially the entire interval T14–T3, as illustrated by dotted waveform 304 of FIG. 3e. Current will flow in transistors 94 and 110 for the interval T14–T0, and in transistor 96 during the much longer interval T0–T3. Consequently, the interval during which capacitor 120 discharges will much exceed the interval in which it charges. As illustrated by dotted waveform 310 of FIG. 3i, the disparity in charge and discharge times results in a more negative voltage remaining on conductor 120 after the comparison interval. This more negative voltage when applied to comparator 82 as a reference will cause time T4 to occur earlier during the recurrent cycle, thus initiating drive pulse 269 earlier and compensating for the increase in delay T10–T0 between termination of the drive pulse and the desired center of the retrace pulse interval.

The described invention provides control of the phase and frequency of a horizontal deflection circuit to maintain the retrace pulses in synchronism with the average time of the synchronizing signals and maintains the synchronism regardless of variations of duration of the retrace pulses with changes in loading of the horizontal deflection circuit. Because fewer parts are used, the arrangement is more reliable than the prior art.

While the connections of logic circuits 200 as described are applicable for the case of high-speed logic, those skilled in the art will recognize that modifications are required in the case of medium-speed logic circuits such as integrated-injection logic. In particular, conductors i and j should be connected to the inputs of inverters 196 and 194, respectively, to compensate for the phase shift of I²L circuits. As is known to those skilled in the art, a controllable oscillator may be used in place of delay circuit 72, logic 200 and pulse-width control circuit 150, thereby producing horizontal deflection circuit drive pulses such as those of FIG. 2s directly and eliminating the waveforms of FIGS. 2h–2r.

What is claimed is:

1. A horizontal synchronizing arrangement for a television display apparatus including a source of horizontal synchronizing signals and also including a horizontal deflection circuit responsive to drive pulses to produce deflection current defining recurrent trace and retrace intervals and producing retrace pulses variably delayed with respect to said drive pulses as a function of loading of said deflection circuit, comprising:

a phase-lock loop including a voltage controlled oscillator having a control input and an output at which an output signal is produced having a frequency substantially equal to a multiple of the frequency of said horizontal synchronizing signals;

a divider coupled to the output of said voltage controlled oscillator for producing a bilevel signal in synchronism with average horizontal synchronizing signals;

a first phase detector having a first input coupled to receive said horizontal synchronizing signals and a second input coupled to receive said bilevel signal, and an output for producing a first phase comparison signal; and a first loop filter coupled between said output of said first phase detector and said control input of said voltage controlled oscillator; and a phase control loop for maintaining said retrace pulses in synchronism with said bilevel signal, said phase control loop comprising:

a ramp generator responsive to said bilevel signal for producing a ramp signal exhibiting a period which is substantially equal to the period of said average horizontal synchronizing signals;

a second phase detector having a first input responsive to said bilevel signal and a second input responsive to said retrace pulses for producing at an output a second phase comparison signal;

a second loop filter coupled to said output of said second phase detector;

a delay circuit having a first input responsive to said ramp signal and a second input coupled to said second loop filter for initiating an output signal at a time delayed by up to approximately one period of said average horizontal synchronizing signals during the occurrence of one period of said ramp signal; and a horizontal drive circuit responsive to said delayed output signal for producing horizontal drive signals.

2. A synchronizing arrangement according to claim 1 wherein said second phase detector comprises:

emitter-coupled first and second transistors, the bases of which form said first input of said second phase detector;

a third transistor, the base of which forms said second input of said second phase detector, and the collector-emitter conduction path of which is coupled to said emitters of said first and second transistors and to a point of reference potential for supplying current to said first and second transistors during said retrace intervals; and means for coupling the collectors of said first and second transistors to a source of energizing potential;

where said bilevel signal produced by said phase-lock loop exhibits a transition from a first state to a second state substantially in synchronism with the occurrence of the center of said horizontal synchronizing signals.

3. A synchronizing arrangement according to claim 2 wherein said means for coupling the collectors of said first and second transistors to a source of energizing potential comprises a current mirror.

4. A synchronizing arrangement according to claim 3 wherein said current mirror comprises:

a fourth transistor having its base coupled to the collector of said first transistor and its collector coupled to the collector of said second transistor to form an output terminal of said phase detector at which said currents of first and second polarities are produced;

a fifth transistor having its collector coupled to said collector of said first transistor and its base coupled to the emitter of said fourth transistor; and means for supplying current from said source of energizing potential to said emitter of said fourth transistor and to the emitter of said fifth transistor.

5. A synchronizing arrangement according to claim 4 wherein said first and second loop filters each includes a capacitor.

6. A synchronizing arrangement according to claim 1 wherein said delay circuit includes means responsive to the initiation of said output signal for terminating said horizontal drive pulse after a predetermined time interval from its initiation.

7. A horizontal synchronizing arrangement for a television display apparatus including a source of horizontal synchronizing signals and also including a horizontal deflection circuit responsive to drive pulses to produce deflection current defining recurrent trace and retrace intervals and producing retrace pulses variably delayed with respect to said drive pulses as a function of loading of said deflection circuit, comprising:

a phase-lock loop for producing a substantially bilevel signal in synchronism with average horizontal synchronizing signals; and a phase control loop for maintaining said retrace pulses in synchronism with said bilevel signal, said phase control loop comprising:

a phase detector including a first input coupled to an output of said phase-lock loop and responsive to said bilevel signal, and a second input coupled to said deflection circuit and responsive to said retrace pulse for enabling the phase detector to produce a current of a first polarity when said bilevel signal is in a first state during the occurrence of a retrace pulse and to produce a current of a second polarity when said bilevel signal is in a second state during the occurrence of a retrace pulse;

loop filter means coupled to an output of said phase detector for filtering said first and second polarity currents to form a control signal;

controllable ramp generator means coupled to said phase-lock loop for generating a recurrent ramp signal at the rate of said bilevel signal; and comparator means coupled to said ramp generator means, to said loop filter and to said horizontal deflection circuit for comparing said ramp signal with said control signal and for initiating a horizontal drive signal in response thereto.

8. A horizontal synchronizing arrangement for a television display apparatus including a source of horizontal synchronizing signals and also including a horizontal deflection circuit responsive to drive pulses to produce deflection current defining recurrent trace and retrace intervals and producing retrace pulses variably delayed with respect to said drive pulses as a function of loading of said deflection circuit, comprising:

a phase-lock loop for producing a substantially bilevel signal in synchronism with average horizontal synchronizing signals; and a phase control loop for maintaining said retrace pulses in synchronism with said bilevel signal, said phase control loop comprising:

a phase detector including a first input coupled to an output of said phase-lock loop and responsive to said bilevel signal, and a second input coupled to said deflection circuit and responsive to said retrace pulse for enabling the phase detector to produce a current of a first polarity when said bilevel signal is in a first state during the occurrence of a retrace pulse and to produce a current of a second polarity when said bilevel signal is in a second state during the occurrence of a retrace pulse;

loop filter means coupled to an output of said phase detector for filtering said first and second polarity currents to form a control signal;

controllable ramp generator means coupled to said phase-lock loop for generating a recurrent ramp signal at the rate of said bilevel signal;

comparator means coupled to said ramp generator means, to said loop filter and to said horizontal deflection circuit for comparing said ramp signal with said control signal and for initiating a horizontal drive signal in response thereto; and a drive duration circuit responsive to said initiation of said horizontal drive signal for terminating said horizontal drive signal after a predetermined interval.

* * * * *